United States Patent
Fraenkel et al.

(10) Patent No.: US 12,128,714 B2
(45) Date of Patent: Oct. 29, 2024

(54) MODEL FOR PREDICTING WEAR AND THE END OF LIFE OF A TIRE

(71) Applicant: COMPAGNIE GENERALE DES ETABLISSEMENTS MICHELIN, Clermont-Ferrand (FR)

(72) Inventors: Anne-Laure Fraenkel, Clermont-Ferrand (FR); Richard Abinal, Clermont-Ferrand (FR); Nicolas Delias, Clermont-Ferrand (FR); Vincent Dubourg, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 671 days.

(21) Appl. No.: 17/413,143

(22) PCT Filed: Dec. 16, 2019

(86) PCT No.: PCT/FR2019/053088
§ 371 (c)(1),
(2) Date: Jun. 11, 2021

(87) PCT Pub. No.: WO2020/120923
PCT Pub. Date: Jun. 18, 2020

(65) Prior Publication Data
US 2022/0024259 A1 Jan. 27, 2022

(30) Foreign Application Priority Data

Dec. 14, 2018 (FR) .................................. 1872931
Jan. 30, 2019 (FR) .................................. 1900866

(51) Int. Cl.
*B60C 11/24* (2006.01)
*B60W 40/10* (2012.01)

(52) U.S. Cl.
CPC .......... *B60C 11/246* (2013.01); *B60C 11/243* (2013.01); *B60W 40/10* (2013.01); *B60W 2552/35* (2020.02)

(58) Field of Classification Search
CPC ..... B60C 11/246; B60C 11/243; B60C 11/24; G01M 17/02; B60W 40/10; B60W 40/12
See application file for complete search history.

(56) References Cited

U.S. PATENT DOCUMENTS

| 6,076,035 A | 6/2000 | Yanase |
| 6,912,896 B2 | 7/2005 | Levy et al. |
| (Continued) | | |

FOREIGN PATENT DOCUMENTS

| EP | 1378378 A1 | 1/2004 |
| JP | 2003-50190 A | 2/2003 |
| (Continued) | | |

OTHER PUBLICATIONS

International Search Report dated Mar. 18, 2020, in corresponding PCT/FR2019/053088 (4 pages).

*Primary Examiner* — Lisa M Caputo
*Assistant Examiner* — Carter W Ferrell
(74) *Attorney, Agent, or Firm* — VENABLE LLP

(57) ABSTRACT

A method for estimating the overall wear of a tire having a crown, the crown comprising a tread having a mean thickness E, the tire delimiting an internal cavity, comprises the following steps: acquiring a transfer function F of the tire on a reference ground depending on influencing factors and the thickness E; acquiring a passage function β of the mounted assembly, said passage function being defined for a section of road; and in a measurement cycle, determining a force FX and a rate of slip g % at the wheel center of the tire, when running in a straight line involving variations in acceleration on the dry section of road; determining a load Z1 experienced by the mounted assembly; determining a temperature (Continued)

T1 of the mounted assembly; and determining an inflation pressure P1 of the internal cavity.

15 Claims, 5 Drawing Sheets

(56) References Cited

U.S. PATENT DOCUMENTS

| | | | |
|---|---|---|---|
| 7,203,603 B2 | 4/2007 | Bertrand | |
| 7,680,610 B2 | 3/2010 | Miyashita et al. | |
| 8,371,159 B2 | 2/2013 | Morinaga | |
| 11,312,188 B2 | 4/2022 | Tamura et al. | |
| 2004/0049303 A1* | 3/2004 | Levy | B60C 11/24 |
| | | | 700/32 |
| 2004/0158414 A1 | 8/2004 | Bertrand | |
| 2004/0225423 A1 | 11/2004 | Carlson et al. | |
| 2008/0228411 A1 | 9/2008 | Miyashita et al. | |
| 2010/0186492 A1 | 7/2010 | Morinaga | |
| 2015/0057877 A1* | 2/2015 | Singh | B60C 11/246 |
| | | | 701/34.4 |
| 2015/0231932 A1 | 8/2015 | Singh | |
| 2015/0285712 A1* | 10/2015 | Singh | B60T 8/171 |
| | | | 73/8 |
| 2017/0363515 A1* | 12/2017 | Poloni | G07C 5/0808 |
| 2019/0160886 A1 | 5/2019 | Tamura et al. | |
| 2021/0008933 A1* | 1/2021 | Kretschmann | B60W 40/12 |

FOREIGN PATENT DOCUMENTS

| | | |
|---|---|---|
| JP | 2004-67009 A | 3/2004 |
| JP | 2004-155413 A | 6/2004 |
| JP | 2005-205956 A | 8/2005 |
| JP | 2006-232011 A | 9/2006 |
| JP | 2008-82914 A | 4/2008 |
| JP | 2012-162259 A | 8/2012 |
| JP | 2014-228963 A | 12/2014 |
| WO | 03/014693 A1 | 2/2003 |
| WO | 2009/008502 A1 | 9/2010 |
| WO | 2017/212915 A1 | 12/2017 |

* cited by examiner

MODEL FOR PREDICTING WEAR AND THE END OF LIFE OF A TIRE

FIELD OF THE INVENTION

The present invention relates to a method for estimating wear on an overall scale, and also to a method for predicting the end of life of a tyre under conditions of use on a vehicle and to a system for implementing these methods.

TECHNOLOGICAL BACKGROUND

In the field of methods for evaluating the wear of a tyre under conditions of use on a vehicle, a simple and easy way of determining said wear is frequently considered to be to evaluate the overall wear corresponding to the mean reduction in the height of the tread. To this end, it is commonly envisaged to make use of an intermediate physical quantity that is sensitive to the wearing of the tread of a tyre, for example the rolling radius Re or the longitudinal stiffness $K_{XX}$. This second quantity represents the slope of the curve representing the longitudinal forces $F_X$ generated by the variation in rotational speed w between the wheel centre and the tread when the mounted assembly runs on the road. The sensitivity of the longitudinal stiffness to the overall wear of the tyre casing is much greater than the sensitivity of the rolling radius.

Methods using such a second quantity to characterize the overall wear of the tread of the tyre in service are known from the prior art, from the document US607035A. Specifically, this quantity is sensitive to the reduction in the height of the tread characterizing the overall wear of the tyre casing.

However, this physical quantity is also sensitive to other parameters such as the inflation pressure, the temperature, the load supported by the mounted assembly, the nature of the ground on which the mounted assembly is running. In addition, it is necessary to take into account variations in the set of influencing parameters in order to extract the variation in longitudinal stiffness due only to the reduction in the height of the tread of the tyre. To this end, the recommended solutions consist in taking into account the variations of these influencing parameters by way of additional measurements or additional information. Although this seems fairly easy with regard to the temperature or the inflation pressure of the tyre via direct measurements, the task is much more tricky with regard to the nature of the ground or other influencing parameters. Of course, not taking an influencing parameter into account results in a mistake being made in the evaluation of the overall wear of the tyre.

The objective of the present invention is to propose solutions that make it possible to take into account all of the influencing parameters and in particular the nature of the ground, in order to make the estimation of overall wear and the end-of-life prediction of the tyre more precise.

DESCRIPTION OF THE INVENTION

The invention relates first of all to a method for estimating the level of overall wear of a tyre of an assembly mounted under running conditions on a vehicle. The tyre has a crown which is extended by two sidewalls that end in two beads, exhibiting revolution about a natural axis of rotation. The crown comprises a tread situated radially on the outside of the tyre with respect to the natural axis of rotation, said tread having a mean thickness E. The mounted assembly comprises components, namely a wheel and the tyre, delimiting an internal cavity. The estimation method comprises the following steps:

optionally, acquiring an identification of the at least one component of the mounted assembly, preferably the tyre casing;

acquiring a transfer function F of the mounted assembly between a longitudinal stiffness $K_{XX}^{ref}$ on a reference ground and influencing factors, as the product of a first function F1 having as influencing factors at least the inflation pressure P, the temperature T and the load Z experienced, and a second, bijective function F2 having at least as influencing factor the thickness E of the tread;

acquiring a passage function β of the mounted assembly, said passage function being defined for a section of road as the ratio of the longitudinal stiffnesses $K_{XX}$ of the mounted assembly for the same influencing factors, the numerator stiffness being evaluated on ground equivalent to the section of road and the denominator stiffness being evaluated on a reference ground;

in one and the same measurement cycle:

determining at least one force $F_X$ experienced by the mounted assembly and at least one rate of slip g % at the wheel centre of the mounted assembly, or acquiring parameters Q1 of the vehicle allowing the determination thereof, when the vehicle is running in a straight line involving variations in acceleration on said section of road, the latter being dry;

determining a load Z1 experienced by the assembly mounted under running conditions or the parameters Q2 of the vehicle allowing the determination thereof;

determining a temperature T1 of the assembly mounted under running conditions;

determining an inflation pressure P1 of the internal cavity of the assembly mounted under running conditions.

The method is characterized in that it comprises the acquisition of a first longitudinal stiffness $K_{XX}^{act}$ of the mounted assembly on actual ground with the aid of a first relationship between the force $F_X$ and the rate of slip g % or the parameters Q1, in that it comprises the acquisition of a second longitudinal stiffness $K_{XX}^{ref}$ on the reference ground, said second longitudinal stiffness being evaluated with the aid of the transfer function F supplied with at least the influencing factors T1, P1, Z1 or the parameters Q2, and at least one characteristic thickness E0 of the tread, in that it comprises the acquisition of a scalar $\beta_1$ defined with the aid of the passage function β supplied with at least the influencing factors T1, P1, Z1, and in that the thickness E of the tread is determined by a second relationship between the scalar β1, the first longitudinal stiffness $K_{XX}^{act}$ and the second longitudinal stiffness $K_{XX}^{ref}$ as follows:

$$E = F_2^{-1}\left(\frac{F_2(E_0) * K_{xx}^{act}}{\beta_1 * K_{xx}^{ref}}\right)$$

The term "measurement cycle" is understood here as meaning that the mounted assembly is under the same conditions of use for the parameters such as the inflation pressure P, the temperature T and the load Z experienced. Of course, the term "the same conditions" means that the variations in these parameters during the measurement cycle are insignificant with respect to the mean value of these parameters over the entire measurement cycle. In addition, the wear E of the tread and any other influencing parameter associated with the state of the mounted assembly are considered not to vary over the same measurement cycle. Specifically, the measurement cycle has a duration much shorter than the duration necessary for observing a variation in the state of the mounted assembly.

The term "state cycle of the mounted assembly" is understood here as meaning that the influencing parameters of a second group H such as the thickness of the tread are constant throughout the cycle. By contrast, the parameters of a first group G associated with use may vary throughout this cycle.

The term "acquire an item of data" is understood here as meaning that this item of data is defined by a measurement, an estimation, or that this item of data is determined in an inclusive manner.

As a result, it is necessary for the various parameters of the mounted assembly to be determined in a short time corresponding to the measurement cycle. Any of the means of the prior art that comply with this constraint can be used. Thus, the pressure P1 and temperature T1 measurements will conventionally be acquired by direct or indirect sensors. By way of non-limiting example, a pressure sensor in fluidic communication with the internal cavity of the mounted assembly is a direct measurement of the inflation pressure. By contrast, a temperature sensor for the fluid contained in the internal cavity is an indirect measurement of the temperature of the mounted assembly and in particular of the tread of the tyre. The use of a thermal model taking into account exchanges of heat between the various components (internal fluid, components of the mounted assembly and external fluid) and in the various transmission modes (radiation, convection, conduction) is necessary. Of course, a measurement via a thermocouple installed in the tyre is a more direct measurement of the temperature, but this is tricky to implement since it requires structural modification of the tyre casing.

These sensors are conventionally packaged in electronic systems fixed to the mounted assembly, for example TPMS (Tyre Pressure Monitoring Systems) mounted at the valve or TMS (Tyre Mounted Sensors) fixed to the internal wall of the tyre delimiting the internal cavity.

As regards the load experienced by the mounted assembly, various measurement techniques are possible. Initial estimates based on the evaluation and then distribution of the overall static load of the vehicle can be used. In addition, the static mass of the vehicle can be adjusted using indicators of the vehicle included in the group comprising the fuel level, the seat belt engager, the attitude of the vehicle, the state of compression of the shock absorbers. In this case, a set of parameters Q1 of the vehicle is used.

More direct measurements on the mounted assembly can also be envisaged. For example, the calibration of a periodic signal per wheel revolution makes it possible to extract a longitudinal dimension, characteristic of the contact between the tyre casing and the ground for a given mounted assembly. In this case, a sensor sensitive to the radial and/or longitudinal deformation of the tyre, of the accelerometer or piezoelectric element type, for example, is envisaged. The use of charts between this characteristic dimension and the inflation pressure P makes it possible to work back to an evaluation of the load Z experienced by the mounted assembly.

Of course, other devices can also be used. By way of non-limiting illustrative example, it will be noted that the processing of at least two measurements of circumferential contraction or extension in at least one sidewall of the casing at two spatially fixed points, situated at different azimuths around the circumference, makes it possible to estimate the forces at the wheel centre. This circumferential extension or contraction of the sidewalls is advantageously estimated by measuring the distance between the threads of the carcass ply of the sidewalls. Reference may be made to the patent document WO-A-03/014693 in the name of the Applicant for a detailed description of this measurement of the characteristics of the mounted assembly.

Finally, for the measurement of longitudinal stiffness $K_{xx}$, this requires both a measurement of the forces $F_x$ at the wheel centre of the mounted assembly and the rate of slip g % of the mounted assembly with respect to the actual ground. Thus, it is necessary to acquire reliable information relating to these two quantities in real time.

For longitudinal forces $F_x$ at the wheel centre of the mounted assembly, these can be estimated, for example, by way of the torques applied around the axis of rotation of the mounted assembly, whether these are driving or braking torques. This involves it being possible to work back to these data via the characteristics of the vehicle.

They can also be acquired by way of the static load of the vehicle and the longitudinal acceleration of the centre of gravity of the vehicle coupled with the distribution of driving and braking forces between the front and rear axles. Optionally, the physical model that makes it possible to work back to the longitudinal forces $F_x$ at the wheel centre of the mounted assembly takes into account different parameters Q2, including the gradient of the road, the speed of forward movement of the vehicle, the aerodynamic drag of the vehicle and the rolling resistance of the tyre casing.

Finally, more direct measurements on the mounted assembly can also be envisaged in order to evaluate the wheel centre forces $F_x$. By way of non-limiting illustrative example, it will be noted that the processing of at least two measurements of circumferential contraction or extension in at least one sidewall of the casing at two spatially fixed points, situated at different azimuths around the circumference, makes it possible to estimate the forces at the wheel centre. This circumferential extension or contraction of the sidewalls is advantageously estimated by measuring the distance between the threads of the carcass ply of the sidewalls. Reference may be made to the patent document WO-A-03/014693 in the name of the Applicant for a detailed description of this measurement of the characteristics of the mounted assembly.

The other characteristic that is indispensable for evaluating the longitudinal stiffness $K_{xx}$ is the rate of slip g % of the mounted assembly at the wheel centre. This quantity can be estimated directly from the data supplied by the electronic systems on board the vehicle, such as the ABS system. It can also be evaluated by way of three elementary parameters, which are the rotational speed W of the mounted assembly at the wheel centre, the rolling radius Re of the mounted assembly and the speed of forward movement V0 of the vehicle.

The rotational speed W can be acquired simply by a wheel revolution encoder coupled to a clock. The rolling radius Re of the mounted assembly, which is not very sensitive to wear, is acquired with the aid of the distance travelled by the vehicle and the number of revolutions carried out by the mounted assembly to travel this distance. Finally, the speed of forward movement V0 of the vehicle is acquired via a high-frequency measurement device of the RT 3000 type, for example, in order to have sufficient precision.

Finally, the overall wear of the tyre is evaluated in real time by the virtually simultaneous determination of the parameters of the mounted assembly, these being the use conditions, influencing the longitudinal stiffness $K_{XX}$ of the mounted assembly and state parameters of the mounted assembly, and in particular of the tyre, which were determined over a possibly longer time.

In particular, it is necessary to take into account the influence of the nature of the ground by way of an indicator, the scalar β1 defined with the aid of the passage function β. Unlike the solutions proposed in the prior art, the indicator chosen is not constructed just from the information about the macro-roughness of the ground. Above all, the indicator is also associated with the mounted assembly and in particular the interaction thereof with the ground, which is expressed by way of the stiffness of the tread of the tyre, which is the structural element of the tyre in contact with the ground. Thus, the passage function β, and consequently the scalar β1 are defined with the aid of the longitudinal stiffness of the mounted assembly and they are associated with the mounted assembly. Of course, the passage function β is also associated with the section of road characterized by its geographic location using GPS data, for example. However, an inclusive function could be adopted for this quantity β knowing the sensitivity of the longitudinal stiffness $K_{XX}$ of the mounted assembly depending on the nature of the ground, depending on the state of the tyre and an estimate of the nature of the actual ground of the section of road. The taking into account of the interaction between the ground and the mounted assembly is a key factor for identifying the quality of the thickness E of the tread. The identification of the passage function β of the mounted assembly is acquired using an experimental characterization campaign and/or numerical simulations. For this purpose, a set of characterizations is created comprising the longitudinal stiffnesses of the mounted assembly with the same influencing factors between the ground to be characterized and a reference ground. The passage function β depends potentially on the influencing factors associated with the use of the mounted assembly, these being for example the inflation pressure P, the temperature T and the load Z experienced by the mounted assembly.

In addition, the transfer function F on reference ground is an intrinsic item of data for the mounted assembly. This makes it possible to cleanly dissociate the variations in longitudinal stiffness caused by the use parameters, such as the pressure P, and state parameters, such as the wear of the tread, of the mounted assembly independently of those generated by the parameters associated with the road surface in general. In addition, the identification of this transfer function F can be effected under controlled metrological conditions. Knowing the ground and the use and state conditions, in particular the load, is essential for precise identification of this transfer function F. Thus, better precision of the estimation of the mean thickness E of the tread is achieved independently of the interaction with the actual ground.

Finally, the identification of the overall wear of the tread is carried out under running conditions without the need for a stop to carry out a manual inspection or to structurally modify the tyre in order to interrogate it using contactless measurement means. As a result, the process is not intrusive with respect to the tyre product, nor is it restrictive for the user of the vehicle.

Preferably, with the transfer function F of the mounted assembly depending on the ageing D of at least one of the components of the mounted assembly, the method comprises the determination of the ageing D1 of the at least one component of the mounted assembly in a first state cycle of the mounted assembly and the acquisition of the second longitudinal stiffness $K_{XX}^{ref}$ is effected using the ageing D1 of the at least one component of the mounted assembly.

The ageing D of the components of the mounted assembly and very particularly those comprising materials based on elastomer compound, such as the tyre, has a non-negligible influence on the longitudinal stiffness $K_{XX}$ of the mounted assembly. This is because the ageing of these materials modifies the stiffness of the components associated with these materials. This has an influence on the longitudinal stiffness value of a mounted assembly between two states of ageing of this same mounted assembly. As a result, ageing is also an influencing factor. However, ageing is associated with the state cycle of the mounted assembly and not with the measurement cycle. As a result, it is an influencing factor on the longitudinal stiffness $K_{XX}$ of the second group H associated with the state of the mounted assembly. Consequently, the ageing of the components of the mounted assembly should be determined less frequently than the factors of the first group of influencing factors.

According to one particular embodiment, the ageing D1 of the at least one component of the mounted assembly is determined by at least one of the quantities included in the group comprising the age, the total distance travelled or the number of cycles effected, the history of the total distance travelled or of the cycles effected, the cumulative thermo-mechanical stress experienced, the history of the thermo-mechanical stresses experienced, the cumulative environmental condition defined by the parameters included in the group comprising ambient temperature, moisture content, the level of ozone and the history of the environmental conditions experienced.

To a first approximation, the ageing of a component, in particular those comprising elastomer compounds, can be likened to the age of the structural components of the mounted assembly, which can be registered in the data of the vehicle.

Specifically, the ageing of the mounted assembly and very particularly that of the tyre can be evaluated with the aid of one or more parameters from the above list. The most elementary model is to take into account only the age of the tyre by way of its date of manufacture. This data is accessible via identification vectors present on the components themselves, such as barcodes, QR codes or any other physical vector. In addition, certain physical vectors are electronic objects commonly known as RFID (Radio Frequency Identification) which can contain the information and communicate it by radio frequency on demand.

Another elementary module would be to take into account the total distance travelled or the number of cycles effected by the latter. A specific ageing model of the components of the mounted assembly and in particular of the tyre or of the products based on elastomer compound would be to take into account the history of thermomechanical stresses experienced by the component and in particular the history of the temperature in operation and during storage of the component. It should be noted that, here, the ageing of the mounted assembly manifests itself in the change of these physical characteristics, for example the stiffness, this being particularly visible on the structural components of the mounted assembly based on elastomer compound.

Advantageously, the acquisition of the transfer function F, and, in the same way, the acquisition of the passage function β, is effected by way of a characterization campaign included in the group comprising numerical simulation and experimental measurements.

This transfer function F, and also the passage function β, requires evaluations of the longitudinal stiffness $K_{XX}$ of the mounted assembly on one and the same reference ground. These evaluations can be carried out experimentally on one and the same ground by varying the different influencing parameters either with the aid of a means for moving the mounted assembly such as a vehicle or a trailer or on a test bed.

Similarly, these evaluations can be simulated numerically by modelling, for each evaluation, one and the same reference ground. This second option is inexpensive when it is necessary to realize the transfer functions F for the entire dimensional range of a tyre model or for various mounted assembly components. Of course, it is possible to mix the two types of characterizations in order, first of all, to validate a numerical model on one tyre size or a particular mounted assembly and then extend the characterization numerically to the dimensional range of the tyre or variants of the structural components of the mounted assembly.

Very advantageously, the acquisition of the transfer function F is effected on macro-smooth ground.

The term "macro-smooth ground" is understood here as meaning the specific characteristics of ground approximately at the millimetre scale. These specific characteristics are thresholds from which the ground is considered to no longer exhibit roughness at this scale. If the characteristic considered is the MTD (acronym for Mean Texture Depth) using a volumetric measurement according to the standard NF EN 13036-1, the characteristic may be the mean diameter of the circle formed by the calibrated glass beads of the method for an elementary quantity of these beads or the quantity of beads deposited and then spread to form a circle with a diameter of 0.2 metre determined on this ground. The indicator considered may also be the roughness of the ground, the MPD (acronym for Mean Profile Depth) according to the standard NF EN 13473-1. Finally, the indicator considered may also be the macro-roughness of the ground, the mean diameter of the indenting bodies and/or the spatial density thereof and/or the height thereof which are acquired by a three-dimensional profilometric measurement of the ground as illustrated in the Applicant's application FR2948764A1, the macro-roughness of the ground will be a density of indenting bodies greater than Densmax, a mean diameter of these indenting bodies less than Diammin and a mean height less than Hautmin. The identification of these various thresholds can be acquired by applying the characterization methods of the macro-roughness of the ground on bonded ground of the type 120 from 3M or 180 from Norton, considered to be macro-smooth by way of example.

Specifically, if the ground has low macro-roughness, the longitudinal stiffness $K_{XX}$ of the mounted assembly is at a maximum. This makes it possible to have higher response dynamics in the variations of the influencing parameters, thereby making it easier to identify the transfer function F. In addition, the numerical simulation of smooth or macro-smooth ground is elementary, making it possible to optimize the calculation time in numerical simulation. However, in an experimental campaign in particular on a test bed of the flat track type for example, the use of a film bonded to the metal track reproducing the smooth ground is necessary to obtain a certain level of grip in the contact patch between the tread of the tyre and the rolling road of the test bed.

Preferably, the acquisition of the transfer function F is effected using a mathematical model of the type:

$$F = \left( \prod^{j} \left( \frac{M^j}{M_0^j} \right)^{\alpha_j} \right) * \left( \frac{E}{E_{ref}} \right)^{\alpha}$$

where
$M^j_0$ and $E_{ref}$ are constants:
$\alpha_j$, and $\alpha$ are real numbers;
$M^j$ are influencing factors;
E is the thickness of the tread.

This form of transfer function is suitable for aligning the experimental results; it makes it possible to cover a wide range of values for the set of influencing parameters instead of concentrating on the region of a nominal position via a limited development for example. In addition, the influencing parameters are in this case independent of one another, thereby making it easier to identify the parameters of the transfer function F. Finally, this transfer function is focused on the interaction of a single ground, the reference ground, with the mounted assembly. This sensitivity of the longitudinal stiffness $K_{XX}$ to this coupling between the mounted assembly and the various grounds is considered to be integrated only in the passage function β.

According to one particular embodiment, the acquisition of the passage function β comprises the following steps:
  carrying out a set of measurement cycles associated with various sections of road, the sections of road being dry, in one and the same state cycle of the mounted assembly;
  acquiring, for each measurement cycle, the first longitudinal stiffness $k_{XX}^{act}$ on actual ground and the second longitudinal stiffness $k'^{ref}_{XX}$ on reference ground;
  acquiring, for each measurement cycle, a difference X between the first and the second longitudinal stiffness;
  defining a target measurement cycle from the set of measurement cycles by identifying the one that has the smallest difference X;
  assigning the identity function to the passage function β defined for the section of road associated with the target measurement cycle.

This is a particular case of the use of the method in which the transfer function F is evaluated on macro-smooth ground. Thus, by looking, in one and the same use cycle of the mounted assembly, for the section of road corresponding to the smallest difference between the first and the second longitudinal stiffness, it is possible, by multiplying the measurements of longitudinal stiffness, to tend greatly towards or even achieve a section of road in which this difference is zero, corresponding to macro-smooth ground. The probability of 100% will be achieved for an infinite number of stiffness measurements on a set of sections of road representative of the variety of ground types. Thus, the passage function β for this mounted assembly on this section of road minimizing the difference X also tends towards identity. The identification of the thickness E of the tread is acquired directly by identifying the influencing parameters of the first group G.

The identity function is understood here as meaning that, whatever the set of parameters of the function, in this case the passage function β, this always returns the same result, in this case a scalar β1 with a value of one.

Of course, it is important to associate, with the passage function β defined for this section of road, the geographic location of this section of road in order for it to be possible to reuse this intrinsic quantity of the road surface in the future evaluations of the wear of the tyre. Generally, the location of this section of road is acquired by way of the GPS data delivered by the vehicle.

According to one preferred embodiment, the acquisition of the passage function β comprises the following steps:
  acquiring a mean thickness E2 of the tread;

carrying out a measurement cycle associated with a section of road, said section of road being dry, in one and the same state cycle of the mounted assembly;

acquiring the first longitudinal stiffness $k_{XX}^{act}$ on actual ground;

acquiring a third longitudinal stiffness $k''_{XX}{}^{ref}$ on reference ground, said third longitudinal stiffness being evaluated with the aid of the transfer function F supplied with the parameters comprising the influencing parameters acquired during the measurement cycle and the thickness E2 of the tread;

acquiring a coefficient λ as the ratio of the first longitudinal stiffness $k_{XX}^{act}$ on actual ground to the third longitudinal stiffness $k''_{XX}{}^{ref}$ on reference ground;

determining the passage function β associated with the section of road passing through the point (λ, P1, Z1, T1) associated with the measurement cycle.

Thus, regardless of the height E of the tread of the tyre, that is to say the total or partial height, it is possible to identify the passage function β associated with a section of road suitable for the measurement of longitudinal stiffness on a vehicle, using the transfer function F of the mounted assembly. This evaluation of the height E of the tread can be acquired by estimation, for example when the tyre has not yet rolled or has rolled only a little, or by measurement by way of a spot measurement with the aid of a manual or indirect measuring instrument via an electronic device of the "drive-over scanner" type.

Of course, it is important to associate, with the passage function β of this second section of road, the geographic location of this second section of road in order for it to be possible to reuse this intrinsic quantity of the road surface in the future evaluations of the wear of the tyre, or of other tyres. Generally, the location of this second section of road is acquired by way of the GPS data delivered by the vehicle.

According to a third preferred embodiment, the acquisition of the passage function β comprises the following steps:

acquiring a passage function β2 of the mounted assembly, said passage function being defined for a second section of road;

acquiring, for the ground of the second section of road, a vector M2 characterizing the macro-roughness of the ground relative to a reference ground;

acquiring, for the ground of the section of road, a vector M characterizing the macro-roughness of the ground relative to a reference ground;

determining the passage function β of the mounted assembly, said passage function being defined for the section of road by a relationship between the passage function β2 and the relative position of the vector M2 with respect to the vector M.

The term "macro-roughness" is understood here as meaning the structural characteristics of the ground approximately at the millimetre scale. Each characteristic represents a variable of the vector M associated with the overall macro-roughness of the ground. Of course, the vector may be limited to a scalar representing for example the MTD (acronym for Mean Texture Depth). This may also be an n-dimensional vector if a certain number of descriptors of the macro-roughness of the ground are taken into account as the number of indenting bodies per unit area, the mean radius of these indenting bodies and the mean height thereof.

According to one preferred embodiment, the method for estimating the level of overall wear comprises the additional steps of:

determining a variation ΔU, between at least two thicknesses E of the tread, of the at least one parameter U associated with the use of the tyre included in the group comprising rotation cycles effected, kilometres travelled, time, use time of the tyre;

determining at least one rate V of overall wear of the tyre, said rate being defined by the ratio between the variation ΔE in the thickness between the at least two thicknesses E of the tread and the variation ΔU of the at least one parameter U associated with the use of the tyre.

Although the estimation of overall wear of the tyre is an indispensable item of data, it is necessary to determine the rate of overall wear of the tyre in order to anticipate, where necessary, a level of wear of the tyre during a future estimation. This makes it possible to supplement, if necessary, the model for estimating overall wear by improving, for example, the identification of the passage function β. This is because the passage function β is dependent on the nature of the ground but also on the stiffness of the tread of the tyre, which will have an impact on the interaction between the mounted assembly and the ground. However, the stiffness of this component of the tyre depends both on the characteristics of the materials of which it is made and also on its geometry and very particularly its thickness.

Of course, this rate of overall wear depends only on the variation both of the thickness E of the tread between two states of the tyre and the variation of a parameter associated with the use of the tyre. Among the most relevant parameters associated with the use of the tyre, the number of cycles effected or the distance travelled between the two estimations of the thickness E can advantageously be coupled with the total time or the simple use time of the tyre between the two estimations of the thickness E.

The invention also relates to a method for predicting the end of life of a tyre having a tread situated radially on the outside with respect to a natural axis of rotation of the tyre, having a mean thickness E, a characteristic thickness E0 and an end-of-life thickness $E^{end}$, comprising the following steps:

determining at least one thickness E1 of the tread of a tyre during at least one first state cycle of the tyre of a first mounted assembly comprising said tyre using the method for estimating the overall wear of a tyre;

determining a rate V1 of overall wear of the tyre, said rate being associated with the at least one thickness E1, using the method for estimating the overall wear of a tyre;

determining a value U1 of the parameter U associated with the use of the tyre, said value being associated with the at least one thickness E1;

determining the end-of-life prediction of the tyre with the aid of a value $U^{end}$ of the parameter U, said value being defined by a second function linking the rate V1 of overall wear, the at least one thickness E1 associated with the value U1 and the end-of-life thickness $E^{end}$.

A first estimation of the end-of-life prediction of the tyre is determined by way of a value $U^{end}$ of the parameter describing the use of the tyre. By extrapolating the rate V1 of overall wear linked to an estimation E1 of the thickness of the tread with which a value U1 of the parameter associated with the use of the tyre is associated, it is possible to identify a value $U^{end}$ corresponding to the threshold value of the parameter U associated with the use of the tyre.

Of course, the closer the end-of-life prediction is carried out to the value $U^{end}$, the more the quality of the prediction is improved. However, this method makes it possible to regularly inform the user of the vehicle or an intermediary of the use potential of the tyre.

The rapidity of calculating the end-of-life calculation associated with the simplicity of implementing the method for predicting overall wear on which it is based gives this method a certain advantage for planning and organizing the maintenance operations on the vehicle relating to the wear of the tyres.

The invention also relates to a system for implementing the method for estimating the level of overall wear of a tyre and/or the method for predicting the end of life of a tyre, comprising:

- a vehicle equipped with at least one mounted assembly comprising said tyre that can be put under running conditions;
- a storage means;
- a calculation means;
- an analysis means;
- a first transmission means between the vehicle and the at least one storage means;
- a second transmission means between the at least one storage means and the at least one calculation means;
- a third transmission means between the analysis means and the storage means or the calculation means;
- input data from the vehicle;
- intermediate data stored in the storage means that can be transmitted by an external system;
- an output result from the calculation means; and
- a decision from the analysis means.

The input data are included in the group comprising the load $Z1$, the temperature $T1$, the pressure $P1$, the force $F_x$, the rate of slip $g$ %, the parameters $Q1$ and $Q2$, the parameter $U$ associated with the use of the tyre and the variation $\Delta U$ of the parameter $U$. The intermediate data are included in the group comprising the thickness $E2$, the ageing $D1$ of the component of the mounted assembly, the characteristic thickness $E0$ and the end-of-life thickness $E^{end}$ of the tread of the tyre, the transfer function $F$ of the mounted assembly, the passage function $\beta$ of the mounted assembly, associated with the section of road, the vector $M$ characterizing the macro-roughness of the ground of the section of road compared with a reference ground. The output result is included in the group comprising the thickness $E$ of the tread of the tyre, the rate $V$ of overall wear of the tyre, the end-of-life prediction $U^{end}$ of the tyre, associated with the parameter $U$, the first longitudinal stiffness $K_{xx}^{act}$, the second longitudinal stiffness $K_{xx}^{ref}$, the third longitudinal stiffness $K''_{xx}{}^{ref}$. The decision expressing the state of wear of the tyre is transmitted to and/or stored in the storage means with the aid of a fourth transmission means.

This system makes it possible to implement the methods of the invention. Specifically, the vehicle equipped with means for acquiring the input data transmits these data to a storage means. The communication between the vehicle and the storage means may be by wire or radio frequency, for example of the Bluetooth, Wi-Fi, GSM/GPRS type or any other frequency band or radiocommunication technology in accordance with a national, regional or international standard. The storage means may also be in communication with an external system such as a drive-over scanner, a database or any other system for acquiring quantities or for storing quantities. The communication between the storage means and the external system is effected independently by wire or by radio frequency communication. This storage means is for its part in communication with a calculation means that carries out the calculation operations required by the processes of the invention. These calculation operations return a result at the end of a process and are supplied with input parameters which are input data or intermediate data stored on the storage means or results from a first calculation.

The system also has an analysis means which retrieves, in a conventional manner, input parameters of the result type which come from the storage means or from the calculation means and returns a decision on the level of wear or the end-of-life prediction of the tyre casing. This decision can alternatively be transmitted to or stored in the storage means by communication depending on the actions to be undertaken according to the nature of the decision, for example wear down to half the height or wear down to the limit. All of the communication arriving at or leaving the analysis means is of the wired or radio frequency type.

In one particular embodiment, with the mounted assembly being equipped with a measurement device comprising a storage means and a means for transmitting to the vehicle or the at least one storage means, some of the input data come from the mounted assembly.

When the mounted assembly is equipped with a measurement sensor, making it possible to acquire, for example, the inflation pressure, the temperature of the fluid cavity of the mounted assembly, the load Z supported, the forces at the wheel centre, the distance travelled or the number of cycles effected, equipped with storage means for the measurement data and with communication means, generally by radio frequency of the Bluetooth, Wi-Fi type for communication with the vehicle or GSM/GPRS and low speed network for communication with an element external to the vehicle, which could, for example, be the storage means, the mounted assembly becomes a secondary source or even the principal source of input data. In this case, the mounted assembly partially or completely replaces the vehicle for the functions thereof within the system for implementing the processes of the invention.

Advantageously, the fourth transmission means comprises a means for transmitting to the vehicle that effects the communication of the at least one decision.

If the decision from the analysis means needs to be transmitted to a decision maker such as the driver of the vehicle on account of the level of risk associated with the state of the tyre casing, it is necessary for the system to be able to transmit the decision directly to the vehicle via a communication of any type.

Preferably, the fourth transmission means comprises a means for transmitting to a third party, such as the manager of the vehicle fleet, that effects the communication of the at least one decision.

If the decision from the analysis means is not urgent as regards the safety of the mounted assembly but requires a decision to be made by a decision maker about the upcoming actions, for example preventative maintenance operations, the decision should be transferred as quickly as possible to this decision maker in order to arrange the maintenance or the upcoming operations. In other cases, the decision is transmitted to the storage means for traceability of the development of wear or the end-of-life prediction of the mounted assembly.

According to one very particular embodiment, a part of the storage means and/or a part of the calculation means and/or a part of the analysis means is/are located on the vehicle or on the mounted assembly.

This is a particular case in which the vehicle is the physical host of the various elements of the implementation system. Thus, the vehicle has means for communication with external systems in order to have access to the various input parameters of the process. It also has a calculator carrying out the current operations for the acquisition of the results of the methods, and an analysis means for detecting the critical states of the mounted assembly. The decisions are returned to the driver or to the manufacturer in order either to plan maintenance operations or to adapt the use of the vehicle to the state of wear of the tyre for example.

BRIEF DESCRIPTION OF THE DRAWINGS

The invention will be understood better from reading the following description. This application is given only by way of example and made with reference to the appended figures, in which.

The figures indexed 1 present characterization curves of the longitudinal stiffness $K_{xx}^{ref}$ depending on the use parameters of a mounted assembly.

DETAILED DESCRIPTION OF EMBODIMENTS

The figures indexed 1a to 1c present an illustration of the characterization curves of a mounted assembly made up of a Michelin brand tyre of size 235/35R19 from the PilotSport 4S range mounted on a sheet-metal machine wheel of the 8.5J19 ET0 type. The mounted assembly thus formed is inflated under nominal conditions to 2.6 bar under a nominal load of 450 kg. The characterizations are carried out on a test bed of the flat track type provided with bonded ground 120 of the 3M brand. The mounted assembly experiences a cycle of stresses made up of braking and acceleration operations in a straight line after pre-rolling of the mounted assembly for 20 minutes over a cycle of moderate stresses. This pre-rolling makes it possible to thermomechanically put the mounted assembly into a stabilized thermal condition.

The measurements of the temperature and of the pressure of the mounted assembly are effected via a TMS positioned on the inner liner of the tyre in line with the crown such that the sensor is substantially in the mid-plane of the tyre. The load experienced by the mounted assembly is applied with the aid of the cylinder of the test bed or a dynamometric hub measures the vertical force $F_Z$ applied and also the longitudinal component $F_X$ and axial component $F_Y$. The measurement is effected with an imposed force by controlling the vertical force $F_Z$ applied. A variation in torque about the axis of rotation of the mounted assembly is applied at the wheel centre of the mounted assembly via the test bed. The torque applied is measured with the aid of the dynamometric hub. In addition, the position of the axis of rotation of the mounted assembly with respect to the ground on which it runs is measured, as is the rotational speed of the wheel centre of the mounted assembly by way of an encoder mounted between the stator and the rotor of the axis of rotation of the test bed. Finally, the running of the ground is also controlled by the machine. In addition, a motion sensor measures the speed at which the ground runs. The presence of the bonded coating makes it possible to avoid slipping of the tyre on the ground while complying with the optional condition of running on a macro-smooth ground.

Figure 1A:
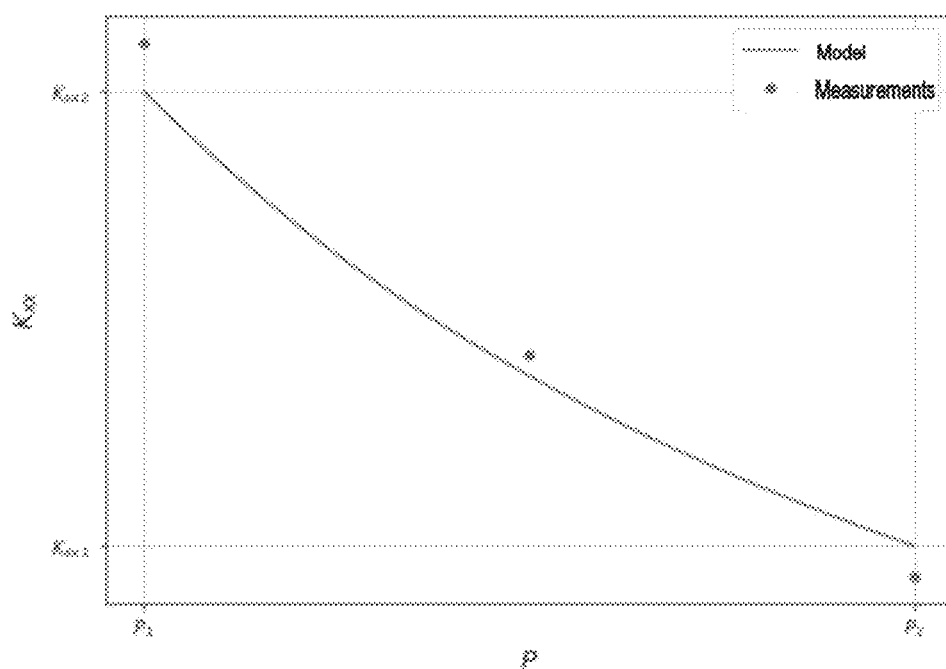

FIG. 1A presents, for this mounted assembly, the experimental characterizations, represented by dots, obtained on a reference ground referred to as macro-smooth for the above-mentioned mounted assembly by varying the inflation pressure P of the mounted assembly between three possible inflation pressures according to the ETRTO (European Tyre and Rim Technical Organisation) standard for this mounted assembly for several controlled loading and temperature conditions. The continuous curve is a transfer function F (1005) model of the independent influencing parameters type which minimizes the error between the experimental points and the mathematical model. Dependence of the second longitudinal stiffness $K_{xx}^{ref}$ at the inflation pressure P is clearly apparent. The measurement points obtained under controlled metrological conditions make it possible to identify the various parameters of the transfer function F (1005) associated with the parameter of the inflation pressure.

Figure 1B:
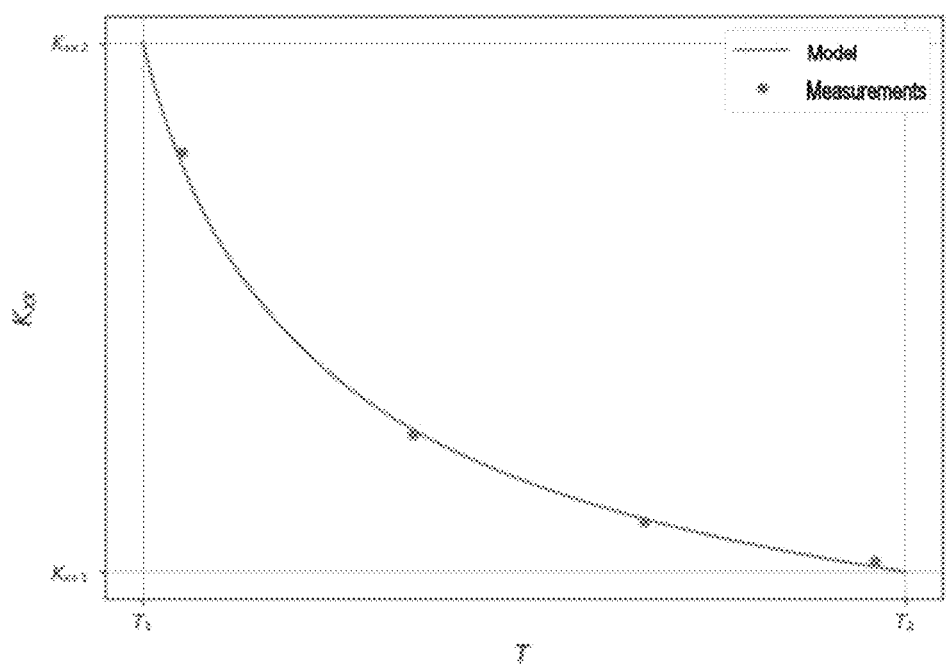
Figure 1C:
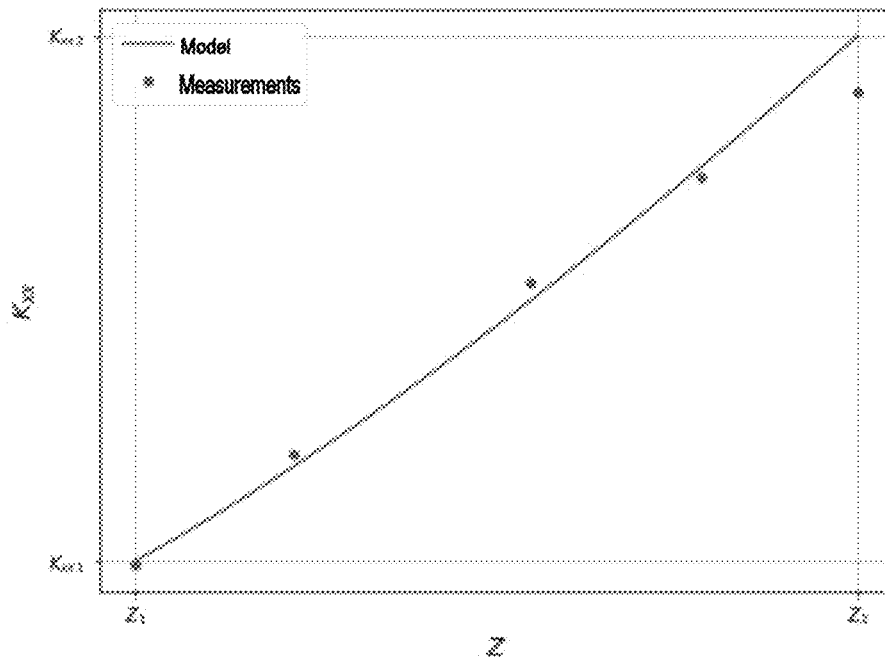

FIG. 1B and FIG. 1C show the characteristics of the same mounted assembly that are effected on the test bed of the flat track type by varying the temperature and the applied load, respectively. The temperature variations in FIG. 1b correspond to temperature variations of the mounted assembly that can be encountered conventionally under various use conditions. They are acquired by varying the regulated temperature of the cell accommodating the test bed and by applying a greater or lesser variation in the stress applied to the tyre. For temperatures that are difficult to control on the test bed, the use of a numerical simulation model of the mounted assembly was used. In a first phase, the numerical model, in particular that of the tyre, was validated using experimental measurements. In a second phase, numerical simulations were effected for thermal stresses that are difficult to reproduce experimentally. For the numerical model, the ground is grippy smooth ground representative of the bonded ground on the test bed.

The variations in load for FIG. 1C are acquired by modifying the controlled load of the test bed, complying with the loads permissible for the mounted assembly according to the ETRTO standard.

The continuous curves are the mathematical model of the transfer function F (1005) identified for this mounted assembly, considering, in the set of influencing parameters, that the parameters are independent of one another. The readjustment of the mathematical model to the various experimental curves allows the unique identification of the various coefficients of the transfer function F (1005) of the mounted assembly on a reference ground of the macro-smooth type.

Of course, the characterizations for the influencing parameters of the first group G are effected on at least three different levels of each influencing parameter of the second group H such as the ageing and the level of overall wear of the tyre and of the first group G other than the one intended to be characterized.

Finally, with the numerical model having previously been validated using experimental measurements of a particular mounted assembly, it is preferable to reuse this numerical model of the tyre in order to form a numerical simulation campaign by modifying the other components of the mounted assembly, the thermomechanical stresses applied and the various states of the mounted assembly. The numerical simulations are less time-consuming and consume fewer resources than the experimental campaigns after the validation phase of the numerical model of the tyre.

Figure 2:
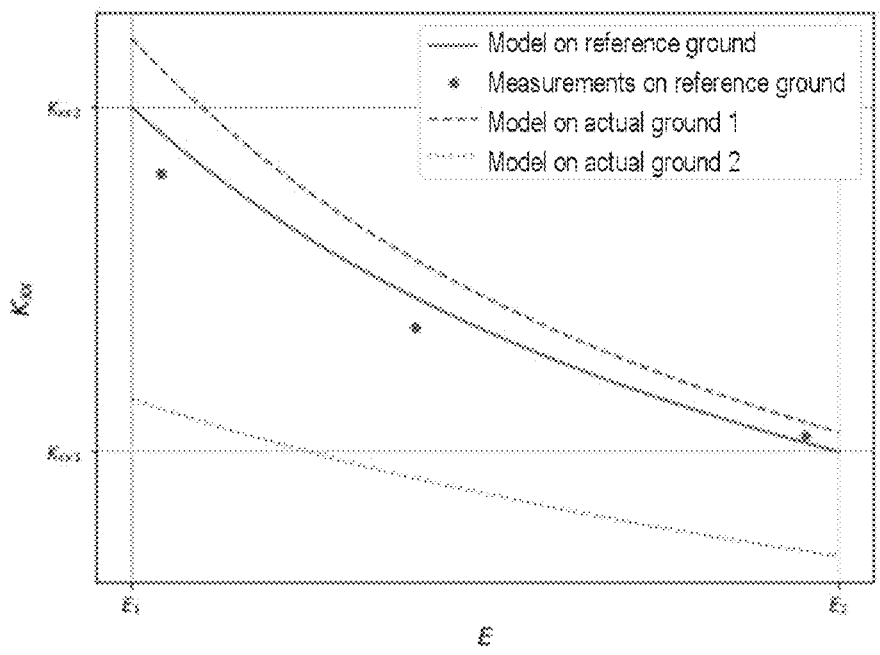
FIG. 2 presents characterizations of the longitudinal stiffness $K_{xx}^{ref}$ depending on the thickness E of the tread of a mounted assembly and the effect of the ground.

FIG. 2 presents the change in the second longitudinal stiffness $K_{xx}^{ref}$ on a reference ground acquired for a mounted assembly comprising a tyre of the Energy Saver type of size 195/65R15 mounted on an alloy wheel 6.5J15 ET23. The measurements were taken on an analytic trailer while running on test tracks of which the macro-roughness is monitored by profilometry. In this case, the variable parameter is the mean thickness E of the tread, with the various other influencing parameters of the longitudinal stiffness such as the load applied, the inflation pressure and the temperature of the mounted assembly also being monitored. The mobile test bed subjects the mounted assembly to varying acceleration phases involving both acceleration and deceleration by applying a torque to the mounted assembly about the natural axis of rotation of the tyre. The variation in the mean thickness of the tread was acquired by the automatic planing of the tyres in one and the same tyre preparation cycle. Thus, the ageing of the various tyres is similar. The altitude of the natural axis of rotation of the mounted assembly was adapted so that the load applied to each mounted assembly was identical. The speed of the tyre corresponds to the linear speed of the mobile test bed via the information relating to the speed of the mobile test bed retrieved on the CAN bus. A wheel marker and a position means for measuring the height of the wheel centre with respect to the ground of the mounted assembly complete the equipment.

In general for tyres equipping passenger vehicles and vans, the torque applied at the wheel centre is around 30 daN·m in order to ensure that the tyre does not slip on the ground, this amounting to saying that the coefficient of slip of the material of the tread under use conditions with respect to the ground is not achieved. Of course, this torque applied should be adapted depending on the category of tyre to be measured.

Discrete measurements, represented by the dots, correspond to the experimental characterizations of the longitudinal stiffness estimated during tests on the reference ground of the test track. The solid curve corresponds to the second longitudinal stiffness evaluated with the aid of the transfer function F (1005) of the mounted assembly corrected by a passage function β (1004) associated with the reference grounds. The two other, dotted or dashed-line, curves correspond to the second longitudinal stiffness evaluated with the aid of the transfer function F (1005) of the mounted assembly each corrected by a passage function β (1004) associated with the actual grounds 1 or 2. In this case, the transfer function F (1005) used is also the product of power functions of the various independent parameters. The passage functions (1004) make it possible to estimate the longitudinal stiffnesses on actual ground with only the transfer function F (1005) of the mounted assembly being known. The passage function β (1004), regardless of the ground, is more or less constant or depends on the thickness E of the tread for a given ground. The various grounds are grounds that are controlled in terms of roughness and make it possible, for one and the same tyre, to acquire a passage function β (1004) variety making it possible to take the nature of the ground into account.

Of course, it is possible to acquire an estimation of the influence of the ageing D of the mounted assembly and in particular of the tyre by preparing tyres that have experienced different kinds of ageing by way of an identical method. For example, by accelerating the ageing by way of specific storage conditions, in an oven for example at various temperatures, or by performing running sessions with greater or lesser thermomechanical stresses, different kinds of ageing will be obtained among the tyres. Planing of the various tyres may also be effected in this case in order to obtain one and the same thickness E of the tread before the characterization campaign for the identification of the transfer function F (1005).

Figure 3:
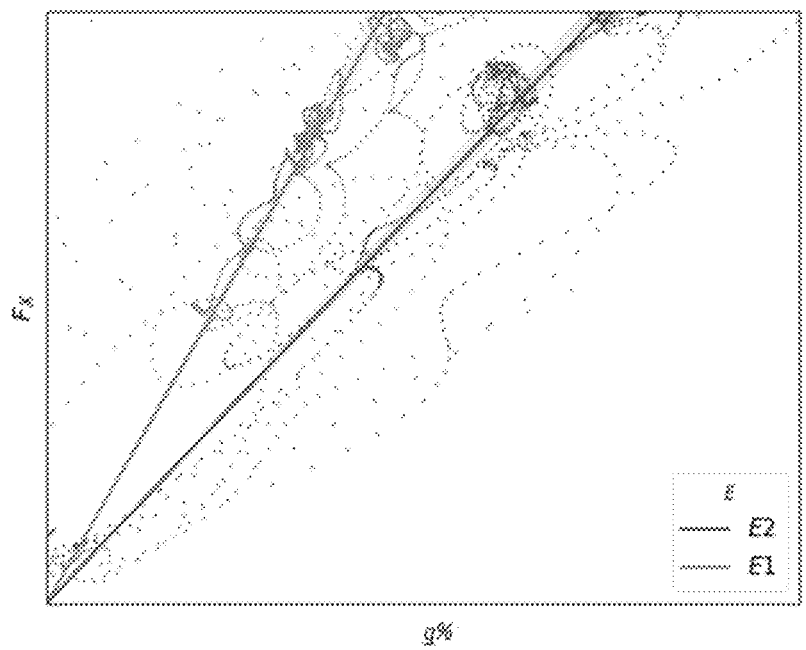
FIG. 3 presents variations in the curves $F_x$(g %) of an assembly mounted on a vehicle in two states of the tyre on one and the same actual ground.

FIG. 3 presents curves of forces $F_X$ in the longitudinal direction of the mounted assembly as a function of the rate of slip g % of a mounted assembly made up of a Michelin brand tyre of size 235/35ZR19 from the range PilotSport 4S mounted on an alloy wheel of type 8.5J19 ET20. This mounted assembly is mounted on the front axle of a traction-type Focus ST vehicle of the Ford brand.

The measurements were taken on one and the same section of road for two different states of the tyre with the same use conditions. The grey measurement points represent a state of the tyre having a thickness E1 and ageing D1 close to the slightly worn and young state of the tyre. The black measurement points represent a second state of the tyre corresponding to a thickness E2 and a level of ageing D2 corresponding to a state close to the end of life of the tyre and ageing equivalent to one year of average use in a temperate country. Only the acceleration phases on the course up to driving torques not exceeding 35 daN·m are shown here in order to consider that the tyre does not slip on the road surface.

With the aid of the continuous curves defined as being the linear regression line of the measurement points of each state of the tyre, the first longitudinal stiffnesses (1009) on actual ground of the two mounted assemblies are estimated here. It can be seen that the level of longitudinal stiffness on actual ground is influenced by the state of the tyre, the other parameters being considered to be equivalent between the two states of the tyre.

Figure 4:
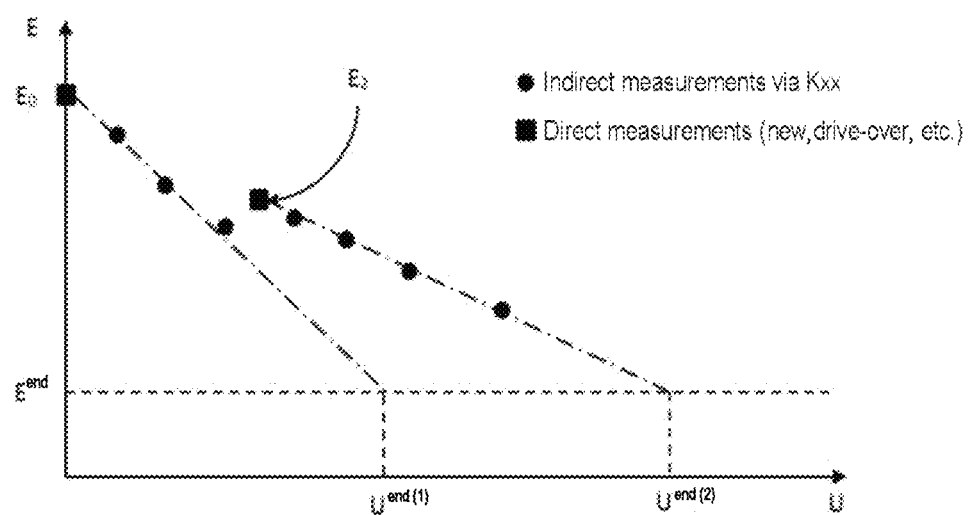
FIG. 4 presents the end-of-life prediction of a tyre, evaluated with the aid of the method.

FIG. 4 shows the estimated progress of the overall wear of a tyre with respect to the change in a tyre U associated with the use of said tyre. This parameter U may be for example the distance travelled or the number of rotation cycles effected by the tyre. The estimation is carried out via the acquisition of the longitudinal stiffnesses (1009, 1010) done regularly throughout the use of the tyre, which are represented by the solid circles. Depending on the nature of the tread of the tyre and on an estimation of the macro-roughness of the ground, a first passage function β (1004) is identified over a section of road in which the measurement of the parameters (1007, 1008) is regularly carried out, making it possible to acquire the first longitudinal stiffness on actual ground (1009) and the second longitudinal stiffness on reference ground (1010). Thus, the method (1000) according to the invention makes it possible to estimate the variation in the mean thickness of the tread during the use of the tyre with respect to a characteristic thickness E0 (1002). It is thus possible to estimate a rate of wear V (1013) by taking into account at least a variation in the mean thickness ΔE of the tread between two acquisitions of the mean thickness (1011), for example the new state and a measurement during the use of the tyre, while knowing the variation ΔU (1012) of the parameter U between the two mean thicknesses taken as reference. Knowing the end-of-life thickness $E^{end}$ (1003) of the tread, beneath which the safety risks are greatly accentuated, makes it possible to identify an end-of-life prediction according to the parameter U called $U^{end}$ (1015) with the aid of the method (1100) for predicting end of life.

Of course, the prediction is based on a hypothesis relating to the passage function β (1004). If, during the use of the tyre, a measurement E2 of the mean thickness of the tyre is taken, during a check of the tyres at a transport vehicle professional for example or when passing over a drive-over scanner at a highway toll booth or traffic lights, a new evaluation of the passage function β (1004) of the section of road can be effected. This manifests itself on the curve in FIG. 4 by a discontinuity which illustrates just the taking into account of the actual measurement E2 of the mean thickness of the tread. A new point, represented by a square in FIG. 4, illustrates this measurement point characterized by the thickness E2 of the tread. Next, the change in slope that may occur results from an adjustment of the passage function β (1004) associated with a section of road. This adjustment is made by identifying a point of the passage function β (1004) associated with the level of overall wear E2. Next, the new curve acquired with a readapted slope, reproducing the rate V of wear of the tyre, can be projected onto the straight line defined by the end-of-life thickness $E^{end}$ (1003) of the tread in order to estimate the end-of-life wear $U^{end}$ (1015) of the tyre. Here, it is assumed that the estimation of the overall wear of the tyre (1011) is realized regularly on one and the same section of road located by a geographic position. The change in ground can thus result for example from the change in the section of road taken as reference to obtain the first longitudinal stiffness (1009). The change in ground may also result from an adjustment of the passage function β (1004) during the use of the tyre. Thus, in the new state, an inclusive function is attributed to the passage function β (1004) as the identity function through unfamiliarity with the nature of the ground where the measurement cycle is carried out. During the use of the tyre, using a characterization method for the passage function β (1004), for example a true measurement of the mean thickness E2 of the tread, makes it possible to identify a passage function β (1004) that is more representative of the nature of the ground.

Figure 5:
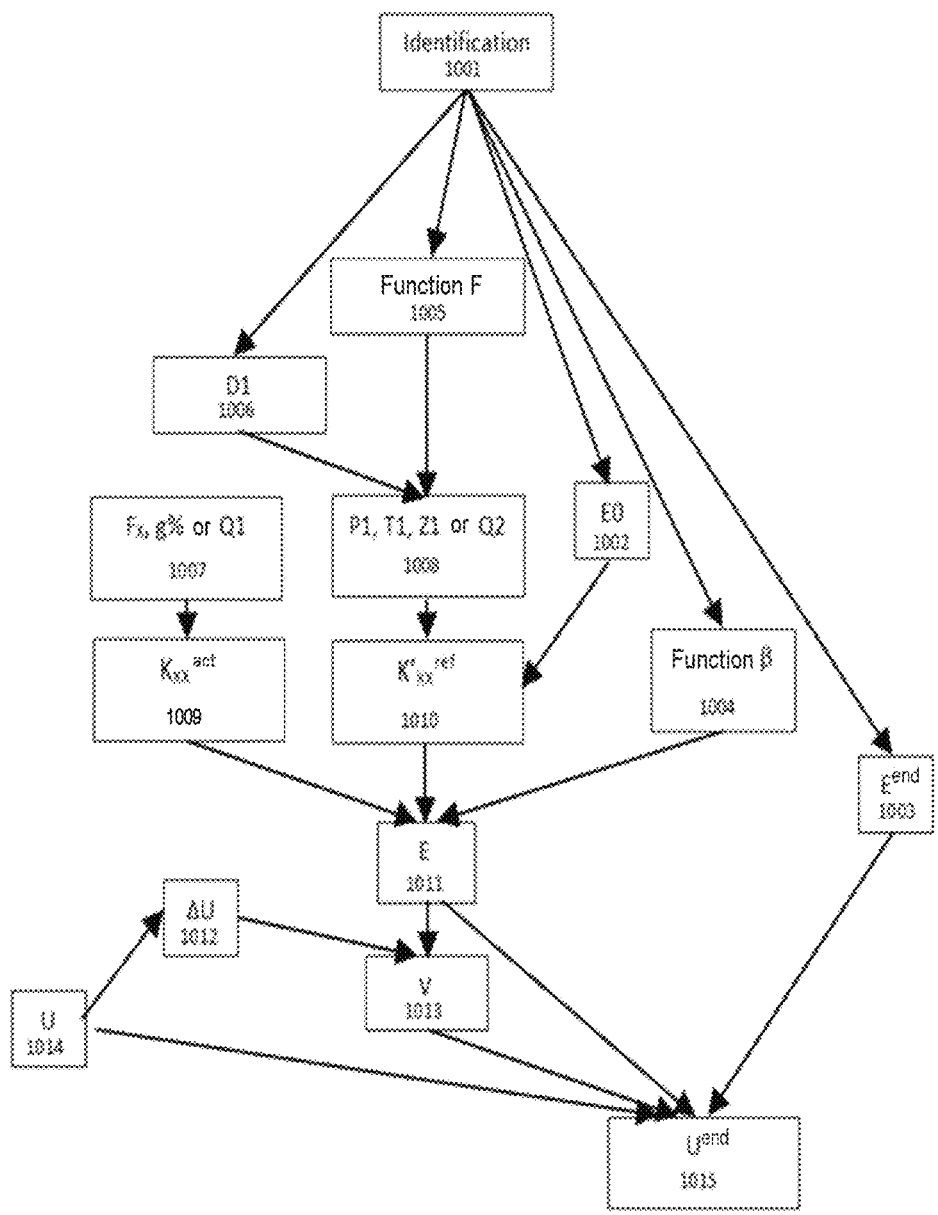
FIG. 5 is a flowchart of the processes of the invention.

FIG. 5 shows a flowchart incorporating the method (1000) for estimating overall wear and the method (1100) for predicting the end of life of a tyre under running conditions on a vehicle.

Step 1001 is the identification of the mounted assembly and very particularly of the tyre. This step can be carried out via the assignment of the identifier of the components of the mounted assembly that are associated with the vehicle in a database.

The identification 1001 makes it possible first of all to define a characteristic thickness E0, corresponding to the step 1002, as, for example, the thickness in the new state and the end-of-life thickness $E^{end}$ of the tyre, corresponding to step 1003. Next, the identification 1001 of the mounted assembly also makes it possible to know the stiffness of the tread of the tyre, thereby making it possible to estimate one or more passage functions β (1004) that are each associated with a section of road characterized by macro-roughness from a plurality of possible passage functions. Failing that, the user chooses a function passage β (1004) from the list of potential passage functions β that is representative of the median nature of the sections of road that the vehicle will encounter. The choice of the passage function β corresponds to step 1004. Finally, the identification 1001 also makes it possible to choose the transfer function F of the mounted assembly corresponding to step 1005. This transfer function F is indispensable for the method for estimating overall wear.

Next, where required, the user finds out the state of ageing of the tyre, corresponding to step 1006. This passes through the identification (1001) of the tyre in order to know the history of the use of the tyre. This history can be found out by interrogating a database. This database may be external to the mounted assembly, present on the vehicle or on a server. If the state of ageing D1 (1006) of the tyre concerns only the age of the product or the total number of cycles effected or kilometres travelled, the information can be present on the mounted assembly by way of an electronic device of the TMS or TPMS type. Necessarily, this step 1006 takes place during a state cycle comprising the measurement cycle for evaluating the mean thickness of the tyre.

The next steps 1007 and 1008 are effected during a measurement cycle. The first step 1007 consists in acquiring, when running in a straight line on a dry road comprising phases of acceleration and deceleration, the associated forces $F_X$ measured at the wheel centre of the mounted assembly and the associated rate of slip g %. In the absence of direct forces $F_X$ at the wheel centre, access to parameters Q1 of the vehicle allows an estimation of the forces $F_X$ at the wheel centre, for example the torque applied to the wheel centre about the natural axis of rotation of the mounted assembly during acceleration or deceleration phases. Step 1008 corresponds to the acquisition of the use parameters of the mounted assembly such as the inflation pressure P1, the temperature T1 of the mounted assembly and the load Z1 applied, or the parameters Q2 of the vehicle that make it possible to acquire the load Z1. These parameters Q2 may be, for example, the static mass of the vehicle, the filling state of the fuel tank, and the indication of the number of buckled seat belts. This step 1008 should be effected just before, during or after the running in a straight line that is effected in step 1007.

Step 1009 chronologically follows step 1007, although it can be done between two measurement cycles. On the basis of the forces $F_X$ measured or evaluated and the associated rates of slip g % when running on the dry section of road, a point cloud associated with the pair of values ($F_X$, g %) is plotted. Of this point cloud, only the set of points for which the tyre does not slip on the section of road is retained. Finally, the linear regression line of the set of points retained is identified. The slope of this regression line corresponds to the estimation of the first longitudinal stiffness $K_{XX}^{act}$ on actual ground corresponding the dry section of road.

Step 1010 chronologically follows step 1008 coupled with steps 1002 and 1005. Thus, on the basis of the transfer function F (1005) chosen by virtue of the identification (1001) of the mounted assembly, a second longitudinal stiffness on reference ground $K_{XX}^{ref}$ is estimated by supplying the transfer function F (1005) with the use parameters P1, T1 and Z1 measured in step 1008 and the thickness characteristic E0 chosen in step 1002. Depending on the sensitivity of the characteristics of the mounted assembly to ageing, this step 1010 can also be coupled with step 1006, in which an evaluation of the ageing D1 of the mounted assembly is effected.

The following step 1011 corresponds to the evaluation of the mean thickness of the tread and, consequently, to the overall wear of the tyre, by comparing this evaluated mean thickness with the specific thicknesses of the tyre, such as $E^{end}$ and E0. For this purpose, a relationship between the results of steps 1004, 1007 and 1008 is applied, the result of which is the mean thickness E associated with the state cycle of the tyre. When the second longitudinal stiffness on reference ground $K_{XX}^{ref}$ (1010) is defined with the aid of a transfer function F (1005) which is the product of power functions of independent influencing factors as claimed in the claim, the thickness E can then be isolated from this transfer function F (1005) as the product of the constant $E_{ref}$ and the alpha root of the ratio of the first longitudinal stiffness on actual ground (1009) to the product of the passage function β (1004) and the second longitudinal stiffness on reference ground (1010). It will be assumed here that the passage function β (1004) is constant with the mean thickness of the tread. In the case of mutually dependent influencing parameters, the relationship identifying the mean thickness E is more complex.

The next step 1012 consists in acquiring the variation ΔU of a parameter U associated with the use of the tyre between two acquisitions of the mean thickness of the tread. The parameter U may be for example the number of rotation cycles about the natural axis of rotation or the number of kilometres travelled by the tread or the use time of the tyre. The two acquisitions (E1, E2) of the mean thickness of the tread may be for example two evaluations carried out by the method corresponding to two states of wear of the tyre or an evaluation of the mean thickness of the tread combined with the new state of the tyre or a measurement of the mean thickness of the tyre using an external measurement means.

The following step 1013 is the evaluation of the rate V of wear of the tyre and more specifically of the tread at a point of acquisition of the mean thickness of the tread of the tyre. To this end, it is necessary to have both the variation ΔU of the parameter U associated with the use of the tyre, acquired in the preceding step, and the corresponding variation of the mean thickness ΔE. The variation ΔE is the difference between the two acquisitions (E1, E2) that served as reference points for the variation ΔU effected in the preceding step. The ratio of the variation of the mean thickness ΔE to the variation of the parameter associated with the use of the tyre ΔU defines the rate V of wear of the mean thickness of the tread according to the parameter U.

Of course, the variation ΔU of the parameter U associated with the use of the tyre can also result from the difference between the acquisitions (U1, U2) of the parameter U that are effected in step 1014.

Finally, the last step 1015 consists in evaluating the end-of-life prediction $U^{end}$ according to the parameter U associated with the use of the tyre. This is obtained by combining the results of steps 1003, 1011, 1013 and 1014.

Figure 6:
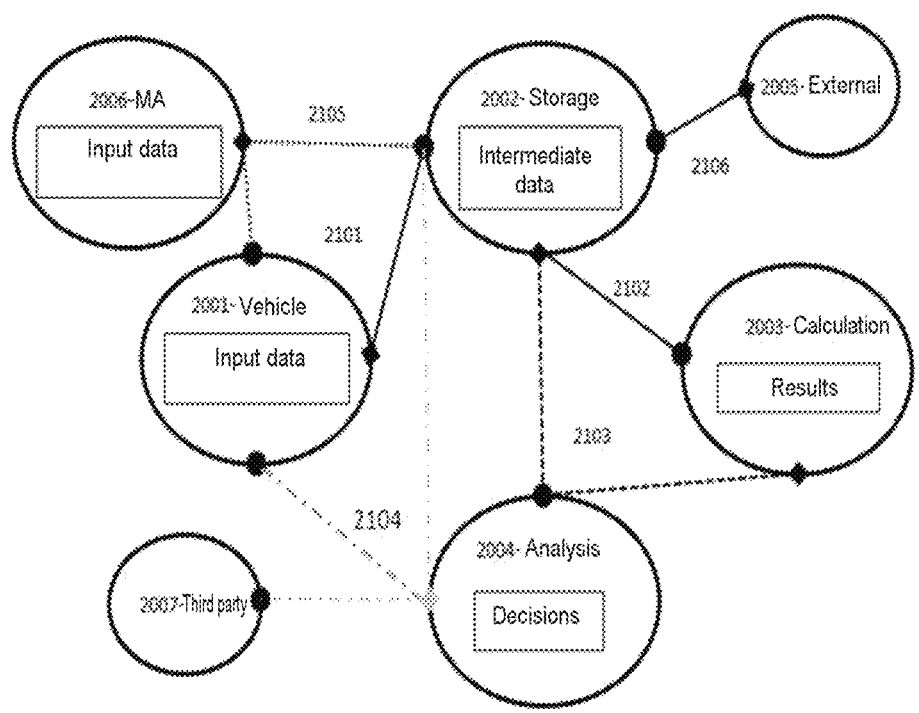
FIG. 6 is a diagram of the system for implementing the processes of the invention.

FIG. 6 is a flowchart of the system for implementing the processes for estimating the level of overall wear and for predicting the end of life of a tyre. The flowchart comprises structural elements represented by bubbles and transmission means between the structural elements represented by a line between the structural elements. The line may comprise, at its end, a solid circle indicating an end point of the transmission means or a solid rhombus indicating a starting point of the transmission means. Even so, the direction of communication indicated may also be bilateral, for example if the process incorporates a phase of interrogating a structural element with respect to another structural element. Finally, the flowchart also comprises the data contained in and exchanged between the various structural elements in the form of rectangles.

The input data are present at the vehicle 2001. These can also be present at least in part at the mounted assembly 2006 comprising the tyre, which is the area of interest of the methods that are the subjects of the present invention. These input data pass to a storage means 2002 via transmission means 2101. When some of the input data come from the mounted assembly 2006, these are transmitted to the storage means 2002 directly or via the vehicle 2001. The transmission means from the mounted assembly, denoted 2015, are represented by black dots.

The intermediate data contained in the storage means 2002 come in part from the input data from the vehicle 2001. However, they can also come from an external system 2005 via transmission means 2106. These intermediate data coming from the external system may be, for example, the transfer function F associated with the mounted assembly or the passage function β forming the link between the stiffness of the tread of the tyre and the nature of the section of road.

Next, the system comprises a calculation means 2003 for acquiring the various results by way of operations between the intermediate data. As a result, a transmission means 2102 allows the communication of the intermediate data to the calculation means 2003 in order to generate results.

These results can then pass via transmission means 2103 in the form of a dotted line to the analysis means 2004, either directly or via the storage means 2002. The analysis means 2004 then delivers a decision, which, via a transmission means 2107 in the form of a grey dot-dash line, will be transmitted directly to the vehicle 2001 or to a third party 2007 or stored in the storage means 2002 depending on how urgent the decision is.

This decision may be an item of information about the state of wear E of the tyre with respect to the end-of-life thickness $E^{end}$ of the tyre. The decision may also, depending on the end-of-life prediction $E^{end}$ of the tyre, be actions involving changing the tyre to be planned or to be effected rapidly. In the first case, the information will be transmitted to a fleet manager in order to arrange the planning. In the second case, the decision returns to the vehicle so that the driver can adapt the conditions of use of the tyre to the state of wear thereof and so that they can expect to change the tyre as soon as possible.

The invention claimed is:

1. A method for estimating a level of overall wear of a tire of an assembly mounted under running conditions on a vehicle, the tire having a crown which is extended by two sidewalls that end in two beads, exhibiting revolution about a natural axis of rotation, the crown comprising a tread situated radially on an outside of the tire with respect to the natural axis of rotation, the tread having a mean thickness E, and the mounted assembly comprising components including a wheel and the tire delimiting an internal cavity, the method comprising the following steps:

fixing tire mounted sensors to the mounted assembly, the tire mounted sensors capable of measuring a temperature and a pressure of the mounted assembly;

acquiring a transfer function F of the mounted assembly between a longitudinal stiffness $K_{XX}^{ref}$ on a reference ground and influencing factors, wherein a first function F1 has as influencing factors at least inflation pressure P, temperature T and load Z experienced, and a second, bijective function F2 has at least as influencing factor the thickness E of the tread;

acquiring a passage function β of the mounted assembly, the passage function being defined for a section of road as a ratio of the longitudinal stiffnesses $K_{XX}$ of the mounted assembly for the influencing factors pressure P, temperature T and load Z, a numerator stiffness of the ratio of the longitudinal stiffnesses being evaluated on ground equivalent to the section of road and a denominator stiffness of the ratio of the longitudinal stiffnesses being evaluated on a reference ground; and, in one and measurement cycle:

determining at least one force $F_X$ experienced by the mounted assembly and at least one rate of slip g % at a wheel center of the mounted assembly, or acquiring parameters Q1 of the vehicle allowing determinations thereof, when the vehicle is running in a straight line involving variations in acceleration on the section of road, the section of road being dry;

determining a load Z1, or acquiring parameters Q2 of the vehicle allowing the determination, experienced by the assembly mounted under running conditions;

determining a temperature T1 of the assembly mounted under running conditions; and determining an inflation pressure P1 of the internal cavity of the assembly mounted under running conditions, wherein the method further comprises acquisition of a first longitudinal stiffness $K_{XX}^{act}$ of the mounted assembly on actual ground with aid of a first relationship between the forces $F_x$, the rates of slip g % or the parameters Q1, wherein the method further comprises acquisition of a second longitudinal stiffness on the reference ground $K_{XX}^{ref}$, the second longitudinal stiffness being evaluated with aid of the transfer function F supplied with at least the influencing factors T1, P1, Z1 or the parameters Q2 and at least one characteristic thickness E0 of the tread, wherein the method further comprises acquisition of a scalar β1 defined with aid of the passage function β supplied with at least the influencing factors T1, P1, Z1, and wherein the thickness E of the tread is determined by a first relationship between the scalar β1, the first longitudinal stiffness $K_{XX}^{act}$ and the second longitudinal stiffness $K_{XX}^{ref}$ as follows:

$$EE = F_2^{-1}\left(\frac{F_2(E_0) * K_{xx}^{act}}{\beta_1 * K_{xx}^{ref}}\right).$$

2. The method according to claim 1, wherein, with the transfer function F of the mounted assembly depending on an ageing D1 of at least one of the components of the mounted assembly, the method further comprises acquisition of ageing D1 of the at least one component of the mounted assembly in a first state cycle of the mounted assembly comprising the measurement cycle, and acquisition of the second longitudinal stiffness $K_{XX}^{ref}$ is effected using the ageing D1 of the at least one component of the mounted assembly.

3. The method according to claim 1, wherein the acquisition of the transfer function F of the mounted assembly is effected by numerical simulation or experimental measurements.

4. The method according to claim 1, wherein the acquisition of the transfer function F is effected on macro-smooth ground.

5. The method according to claim 4, wherein the acquisition of the passage function β comprises the following steps:

carrying out a set of measurement cycles associated with various sections of road, the sections of road being dry, in one and the same state cycle of the mounted assembly;

acquiring, for each measurement cycle, the first longitudinal stiffness $k_{XX}$ on actual ground and the second longitudinal stiffness $k'_{XX}^{ref}$ on a reference ground;

evaluating, for each measurement cycle, a difference X between the first and the second longitudinal stiffness;

defining a target measurement cycle from the set of measurement cycles by identifying the one that has the smallest difference X; and assigning the identity function to the passage function β defined for the section of road associated with the target measurement cycle.

6. The method according to claim 1, wherein the acquisition of the transfer function F is effected using a mathematical model of the type:

$$F = \left(\prod^j \left(\frac{G^j}{G_0^j}\right)^{\alpha_j}\right) * \left(\frac{E}{E_{ref}}\right)^{\alpha}$$

where:
$Gj_0$ and $E_{ref}$ are constants:
$\alpha_j$, and $\alpha$ are real numbers;
$G^j$ are influencing factors; and
E is the thickness of the tread.

7. The method according to claim 1, wherein the acquisition of the passage function β comprises the following steps:

acquiring a mean thickness E2 of the tread;

carrying out a measurement cycle associated with a section of road, the section of road being dry, in one and the same state cycle of the mounted assembly;

acquiring the first longitudinal stiffness $k_{XX}$ on actual ground;

acquiring a third longitudinal stiffness $k''_{XX}^{ref}$ on reference ground, the third longitudinal stiffness being evaluated with aid of the transfer function F supplied with the influencing factors comprising the influencing factors acquired during the measurement cycle and at least the thickness E2 of the tread;

acquiring a coefficient λ as a ratio of the first longitudinal stiffness $k_{XX}$ on actual ground to the third longitudinal stiffness $k''_{XX}^{ref}$ on reference ground; and determining the passage function β associated with the section of road passing through the point (λ, P1, Z1, T1) associated with the measurement cycle.

8. The method according to claim 1, wherein the acquisition of the passage function β comprises the following steps:

acquiring a second passage function β2 of the mounted assembly, the second passage function being defined for a second section of road;

acquiring, for the ground of the second section of road, a vector M2 characterizing the macro-roughness of the ground relative to the reference ground;

acquiring, for the ground of the section of road, a vector M characterizing the macro-roughness of the ground relative to the reference ground; and determining the passage function β of the mounted assembly, the passage function being defined for the section of road by a relationship between the passage function β2 and the relative position of the vector M2 with respect to the vector M.

9. The method according to claim 1 further comprising the following additional steps:

determining a variation ΔU, between at least two acquisitions of the thickness E of the tread, of at least one parameter U associated with the use of the tire including rotation cycles effected, kilometers travelled, time, and use time of the tire; and determining at least one rate V of overall wear of the tire, the rate being defined by a ratio between a variation ΔE in the thickness E between the at least two acquisitions of the thickness E of the tread and the variation ΔU of the at least one parameter U associated with the use of the tire.

10. A method for predicting the end of life of a tire having a tread situated radially on an outside with respect to a natural axis of rotation of the tire, having a mean thickness E, a characteristic thickness E0 and an end-of-life thickness $E^{end}$, comprising the following steps:
  determining at least one thickness E1 of the tread of a tire during at least one first state cycle of the tire of a first mounted assembly comprising the tire using the method according to claim 1;
  determining a rate V1 of wear of the tire, the rate being associated with the at least one thickness E1, by determining a variation ΔU, between at least two acquisitions of the thickness E of the tread, of at least one parameter U associated with the use of the tire including rotation cycles effected, kilometers travelled, time, and use time of the tire and determining at least one rate V of overall wear of the tire, the rate being defined by a ratio between a variation ΔE in the thickness E between the at least two acquisitions of the thickness E of the tread and the variation ΔU of the at least one parameter U associated with the use of the tire;
  determining a value U1 of the parameter U, the value being associated with the at least one thickness E1;
  determining an end-of-life prediction of the tire with aid of a value $U^{end}$ of the at least one parameter U associated with the use of the tire, the value being defined by a second function linking the rate V1 of wear, the at least one thickness E1 associated with a value U1 of the parameter U and the end-of-life thickness $E^{end}$.

11. A system for implementing the method according to claim 1 comprising:
  a vehicle equipped with at least one mounted assembly comprising the tire that can be put under running conditions;
  at least one storage means;
  at least one calculation means;
  at least one analysis means;
  at least one first transmission means between the vehicle and the at least one storage means;
  at least one second transmission means between the at least one storage means and the at least one calculation means;
  at least one third transmission means between the at least one analysis means and the at least one storage means or the at least one calculation means;
  input data from the vehicle;
  intermediate data stored in the at least one storage means that can be transmitted by at least one external system;
  at least one output result from the at least one calculation means; and
  at least one decision from the at least one analysis means,
  wherein the input data include the load Z1, the temperature T1, the pressure P1, the force $F_X$, the rate of slip g %, the parameters Q1 and Q2, the at least one parameter U associated with the use of the tire including rotation cycles effected, kilometers travelled, time, and use time of the tire and variations ΔU of the at least one parameter U,
  wherein the intermediate data are included in the group comprising mean thickness E2 of the tread, ageing D1 of at least one component of the mounted assembly, characteristic thickness E0 and end-of-life thickness $E^{end}$ of the tread of the tire, the transfer function F of the mounted assembly, the passage function β of the mounted assembly associated with the section of road, and vector M characterizing the macro-roughness of the ground of the section of road with respect to a reference ground,
  wherein the at least one output result includes the thickness E of the tread of the tire, the rate V of overall wear of the tire, the end-of-life prediction $U^{end}$ of the tire associated with the parameter U, the first longitudinal stiffness $k_{XX}^{act}$, the second longitudinal stiffness $k'_{XX}^{ref}$, and the third longitudinal stiffness $k''_{XX}^{ref}$, and
  wherein the at least one decision expressing the state of wear of the tire is transmitted to, stored in, or both transmitted to and stored in the at least one storage means with aid of at least one fourth transmission means.

12. The system according to claim 11, wherein, with the mounted assembly being equipped with a measurement device comprising a storage means and a means for transmitting to the vehicle or the at least one storage means, at least some of the input data comes from the mounted assembly.

13. The system according to claim 11, wherein the at least one fourth transmission means comprises a means for transmitting to the vehicle that effects the communication of the at least one decision.

14. The system according to claim 11, wherein the at least one fourth transmission means comprises a means for transmitting to a third party that effects the communication of the at least one decision.

15. The system according to claim 11, wherein a part of the at least one storage means, a part of the at least one calculation means, or a part of the at least one analysis means is located on the vehicle or on the mounted assembly.

* * * * *